United States Patent [19]

Dunn et al.

[11] 4,142,945

[45] Mar. 6, 1979

[54] METHOD OF FORMING A COMPOSITE BODY AND METHOD OF BONDING

[75] Inventors: Bruce S. Dunn, Schenectady; Robert R. Dubin, Ballston Lake, both of N.Y.

[73] Assignee: General Electric Company, Schenectady, N.Y.

[21] Appl. No.: 808,813

[22] Filed: Jun. 22, 1977

[51] Int. Cl.² .................... B23K 28/00; C25D 11/00
[52] U.S. Cl. ................................ 204/16; 156/275
[58] Field of Search ............... 204/16, 195 S, 1 S; 156/272, 273, 275

[56] References Cited

U.S. PATENT DOCUMENTS

| | | | |
|---|---|---|---|
| 2,567,877 | 9/1951 | De Ment | 204/16 |
| 3,256,598 | 6/1966 | Kramer et al. | 156/272 |
| 3,397,278 | 8/1968 | Pomerantz | 174/52 |
| 3,400,054 | 9/1968 | Ruka et al. | 204/195 S |
| 3,417,459 | 12/1968 | Pomerantz | 29/472.9 |
| 3,589,965 | 6/1971 | Wallis et al. | 204/16 |
| 4,070,529 | 1/1978 | Delmas et al. | 204/195 S |

*Primary Examiner*—T. M. Tufariello
*Attorney, Agent, or Firm*—Paul R. Webb, II; Joseph T. Cohen; Leo I. MaLossi

[57] ABSTRACT

A method is disclosed for forming a composite body which comprises bonding a moderately deformable metallic element to at least a portion of at least one major surface and to an associated portion of the edge surface of a solid ion-conductive electrolyte material element which contains mobile ions of a metal different from the metallic element. A method is disclosed for bonding a composite body to a deformable metallic casing which comprises pressing the sharp edge at the open end of the casing against the composite body while employing an inert atmosphere, elevated temperature and pressure.

4 Claims, No Drawings

METHOD OF FORMING A COMPOSITE BODY AND METHOD OF BONDING

The present invention relates to a method of forming a composite body and to a method of bonding and is more particularly concerned with an improved method of forming a composite body wherein a metallic element is bonded to a solid ion-conductive electrolyte material element, and to an improved method of bonding a metallic casing to a composite body.

Reference is made to copending patent application Ser. No. 807,407, filed June 17, 1977, and entitled "A Method of Bonding a Metallic Element to a Solid Ion-Conductive Electrolyte Material Element" which describes such a method for bonding the juxtaposed surfaces of a moderately deformable metallic element to a solid ion-conductive electrolyte material which contains mobile ions of a metal different from the metallic element.

Reference is made to copending patent application Ser. No. 807,377, filed June 17, 1977, and entitled "Composite Body, Method of Forming, and Method of Bonding" which describes a composite body having a solid ion-conductive electrolyte material and a surface portion of an ion-insulating material.

Reference is made to allowed copending patent application Ser. No. 807,406, filed June 17, 1977, and entitled "Composite Body" which describes a composite body which has a substrate with a solid ion-conductive electrolyte region and at least a portion of a major surface with a solid ion-insulating material region, and at least one moderately deformable metallic element bonded directly to the ion-insulating material. These applications are assigned to the same assignee as the present application.

In U.S. Pat. No. 3,397,278 - Pomerantz, entitled "Anodic Bonding" and U.S. Pat. No. 3,417,459 - Pomerantz et al, entitled "Bonding Electrically Conductive Metals To Insulators" there are described methods for bonding electrically conducting metals to insulators. The methods include placing the metal and insulator to be bonded in close surface contact, heating the insulator element, thus rendering it electrically conductive, applying a voltage across the elements and passing a low electrical current through the composite for a short time. The insulator element is heated by a conductive platen to provide sufficient electrical conductivity during the application of the voltage to effect the bonding of the conductive element to the insulator.

Our present invention is directed to bonding a metallic element to a solid ion-conductive electrolyte material element as opposed to the bonding of the metallic element to an insulator in the above last two referenced patents.

Our method is useful to seal the outer metallic casings to the opposite surfaces of the flange in a sodium-sulfur battery. Such a sodium-sulfur battery is described in U.S. Pat. No. 3,960,596 — Mitoff et al, entitled "Battery Casing and Hermetically Sealed Sodium-Sulfur Battery." This patent is assigned to the same assignee as the present application.

In "Ion Exchange Properties of and Rates of Ionic Diffusion in Beta-Alumina" by Y. Yao et al, "Journal of Inorganic Nuclear Chemistry", Volume 29, pages 2453-2475, 1967, there is described that the sodium ion in beta-alumina powders and crystals have been exchanged in molten salts with a number of univalent and divalent ions.

Our present invention is directed also to bonding a composite body to a metallic element which composite body has a solid ion-conductive electrolyte material, a surface portion of an ion-insulating material, and a deformable metallic element bonded to at least a portion of one major surface of the composite body as opposed to the above Y. Yao et al article which describes only exchange of the sodium ion in beta-alumina powders and crystals in molten salts with a number of univalent and divalent ions.

The primary objects of our invention are to provide an improved method of bonding a metallic element to a solid ion-conductive electrolyte material element to eliminate the problem of thermal stress, and to an improved method of bonding a composite body to a metallic element.

In accordance with one aspect of our invention, a method of forming a composite body wich comprises bonding a moderately deformable metallic element to at least a portion of at least one major surface and to an associated portion of the edge surface of a solid ion-conductive electrolyte material which contains mobile ions of a metal different from the metallic element.

These and various other objects, features, and advantages of the invention will be better understood from the following description:

We found that we could form a composite body by bonding a metallic element to a solid ion-conductive electrolyte material element by an improved method. Such a metallic element must be moderately deformable. The electrolyte material element must contain mobile ions of the metal different from the metallic element. The method of formming a composite body comprises providing a solid ion-conductive electrolyte material element with opposite major surfaces and an edge surface, positioning a moderately deformable metallic element against at least a portion of one major surface and against at least an associated portion of the edge surface, the electrolyte material element containing mobile ions of a metal different from the metallic element, applying an electric potential across the elements to pass a finite current of low amperage through the elements to convert a surface portion of the ion-conductive electrolyte material element adjacent the metallic element to an ion-insulating material and to effect bonding between the surfaces of the electrolyte material element and the metallic element.

In copending patent application Ser. No. 807,407, a method is disclosed which comprises juxtaposing the major surfaces of the elements in close surface contact relationship, applying an electric potential across the juxtaposed elements to pass a finite current of low amperage through the juxtaposed elements to convert a surface portion of the ion-conductive electrolyte material element adjacent the metallic element to an ion-insulating material and to effect bonding between the juxtaposed surfaces.

The present application as opposed to copending patent application Ser. No. 807,407, requires the step of positioning a moderately deformable metallic element against at least a portion of one major surface and against at least an associated portion of the edge surface. This step in the present application provides for more efficient removal of sodium ions in the surface portion of the solid ion-conductive electrolyte material element adjacent to the metallic element. This step results in an increase in the resistance of the surface portion of the solid electrolyte material element adjacent to the metallic element.

A solid ion-conductive electrolyte material is an ideal material for a flange to seal the outer metallic casings to the opposite surface thereof and for sealing to the ionic-conductive tube in a sodium-sulfur battery. While a solid ion-conductive electrolyte material element provides an ideal material for such a flange from the standpoint of minimizing thermal stress and avoiding corrosion problems, such a material is ion-conductive as opposed to being insulating. Thus, this material is not useful as a flange in a sodium-sulfur battery. The exposed areas of metal contact to the electrolyte material element would act as shorted sodium-air seals forming $Na_2O$ and $NaOH$ at the junctiion and would eventually destroy the flange.

Our method of bonding can be employed since a surface portion of the electrolyte material element adjacent the metallic element is converted to an ion-insulating material. Thus, an insulating surface or segment is positioned between the remainder of the electrolyte material element and the metallic element.

Our method includes employing a potential across the elements at ambient or elevated temperatures. Our method includes bonding at least a portion of one major surface and at least an associated portion of the edge surface of the electrolyte element to a deformable metallic element. Additionally, at least a portion of both major surfaces and at least an associated portion of the edge surface of the electrolyte material element can be bonded to deformable metallic elements.

A variety of materials can be employed for the metallic elements. Such materials include various types of steels, aluminum, aluminum alloys, copper, copper alloys, silver, silver alloys, noble metals, molybdenum and silicon. The only requirement is that the metal must be moderately deformable. Various solid ion-conductive electrolyte material elements can be employed for the element. Suitable electrolyte materials include beta-alumina, which term is used in the present application to include beta-alumina, beta'-alumina, mixtures thereof, and related compounds. For example, suitable beta-aluminas include lithium beta-alumina, hydronium beta-alumina, and silver beta-alumina. Other electrolytes include those based on silver, such as, silver iodide, or silver rubidium iodide, or on lithium, such as, lithium iodide.

While our method is particularly adapted to forming a flange of a solid ion-conductive electrolyte material to which outer metallic casings are sealed to the opposite surfaces thereof for use in the sodium-sulfur battery, our method is also applicable to bonding such an electrolyte material to metallic elements to form a solid electrolyte and the metal container therefore for use in various solidstate batteries and fuel cells. Thus, the solid ion-conductive electrolyte material might be in the form of a disc of this material with one or more apertures therethrough to provide a flange for use in a sodium-sulfur battery. In various solid-state batteries and fuel cells, the solid ion-conductive electrolyte material would generally be in the form of a disc or flat material.

Our method of bonding is described below for forming a flange with outer metallic casings sealed thereto for use in a sodium-sulfur battery. A solid ion-conductive electrolyte material element of sodium beta-alumina is employed which has a single aperture through its center thus providing a flange or ring configuration. A pair of moderately deformable metallic elements of aluminum are provided which are in the form of aluminum foils. The foils are positioned against opposite major surfaces and against a portion of the associated edge portion of the sodium beta-alumina element. Each aluminum foil provides an anode, while graphite paint applied to the surface of the sodium beta-alumina electrolyte provides a cathode. A separate power source in the form of a battery has its negative lead attached to the cathode, while its positive lead is attached to the anode. An electric potential is applied across each aluminum foil and the sodium beta-alumina electrolyte from the power source. An electric potential can be applied from both power sources at the same time to thereby pass a finite current of low amperage through the adjacent metallic and sodium beta-alumina electrolyte elements. The potential is applied at ambient or elevated temperatures. Effective bonding between the metallic casings and the sodium beta-alumina electrolye element can be accomplished by applying a current density of from 0.5 to 2.0 milliamperes per $cm^2$ for a period of time from 0.5 to 2 hours. If desired, each metallic foil can be bonded to the sodium beta-alumina electrolyte separately. The application of the potential across the elements converts a surface portion of the sodium beta-alumina electrolyte to an ion-insulating material which is positioned adjacent the aluminum foil. In this manner bonding is effected between the respective foil and the sodium beta-alumina. It will, of course, be appreciated that only one aluminum foil might be bonded to one major surface and a portion of the associated edge surface of the sodium beta-alumina.

Our invention is directed also to a method of bonding a composite body to a metallic element which comprises providing a composite body with opposite major surfaces and an edge surface, a solid ion-conductive electrolyte material, a surface portion of an ion-insulating material, and a deformable metallic element bonded to at least a portion of one major surface, providing a deformable metallic casing with an open end having a sharp edge, positioning the sharp edge of the open end of the casing against the deformable metallic element of the composite body, heating composite body and casing in an inert atmosphere at temperature in the range of 300° to 600° C., and pressing the casing against the deformable metallic element in a range from 100 to 4,000 pounds per square inch to effect bonding between the composite body and the casing.

The use of a solid ion-conductive electrolyte material, such as, beta-alumina is based upon its excellent ionic conductivity. For use as a flange or header in a sodium-sulfur battery, it is desirable to increase the resistivity of the surface portion of the beta-alumina without altering its mechanical or physical properties.

The composite body provided in my method of bonding a composite body to a metallic element can be formed, for example, in accordance with copending patent application Ser. No. 807,407 which is described above; in accordance with the above described first method in this application; or in accordance with the methods described in copending patent application Ser. No. 807,377.

The methods of copending patent application Ser. No. 807,377, describe forming a composite body with a solid ion-conductive electrolyte material, and a surface portion of an ion-insulating material; and describes a method of bonding a deformable metallic element to the ion-insulating surface portion of the composite body. The composite body can be provided with at least one aperture therethrough. Such a composite body is desirable as a flange or header in a sodium-sulfur battery. Such a composite body of beta-alumina is sodium resistant and has a coefficient of thermal expansion similar to beta-alumina thus eliminating mechanical stresses arising from a thermal expansion mismatch with the beta-alumina tube employed in the sodium-sulfur battery.

The method of forming this composite body which has a solid ion-conductive electrolyte material, and a surface portion of an ion-insulating material comprises providing a solid ion-conductive electrolyte material element, such as, sodium beta-alumina, submerging the element in a molten salt bath of a salt containing a divalent substitution ion, such as, a strontium$^{++}$ ion, and converting a surface portion of the element to an ion-insulating material, such as, a strontium substituted beta-alumina thereby providing a composite body.

A surface portion of an ion-insulating material is formed on the solid ion-conductive electrolyte material to form the composite body. The ion-insulating material is formed by an ion exchange process wherein a divalent ion, for example, of calcium, magnesium, strontium or barium is substituted for two sodium ions. This exchange is accomplished by immersing or submerging the sodium beta-alumina in a molten bath which contains the desired ions in the form of the nitrates, chlorides, iodides, etc. of calcium, magnesium, strontium, or barium. The depth of penetration of the divalent ion is dependent upon the nature of the ion, the composition of the salt bath, and the temperature and time conditions of the process or treatment.

Quantitative results are obtained by measuring the change in sample weight as a function of time and temperature. Preliminary results in a semilogarithmic plot enables one to calculate an activation energy for ion motion. The large values indicate the insulating nature of the surface layer. A simple ratio of these activation energies with that of Na$^+$ (~4 kcal/mole) implies that the resistivities for the Ca$^{2+}$ and Sr$^{2+}$ surfaces are greater than that of beta-alumina by factors of $10^3$ and $10^5$ respectively. The total resistance of the exchanged beta-alumina material will depend upon the divalent ion thickness layer and the sample dimensions overall.

The following Table I shows specific conditions of this method of forming a composite body.

TABLE I

| Exchange Ion | Bath Composition | Temperature |
|---|---|---|
| 1.) Sr$^{2+}$ | 3 . Sr(NO$_3$)$_2$ . NaNO$_3$ | 600° C. |
| 2.) Ca$^{2+}$ | Ca(NO$_3$)$_2$ . NaNO$_3$ | 500° C. |
| Time | | Penetration Depth of Exchange Ion (calculated) |
| 1.) 1 hour | | 70 × 10$^{-4}$ cm. |
| 2.) 1 hour | | 160 × 10$^{-4}$ cm. |

Once the surface portion is altered, the high activation energy for ion motion ensures that this portion will remain stable even when subjected to molten sodium at 300° C. for prolonged periods. The resistive surface portion will prevent any self-discharge of the cell in areas exposed to the atmosphere.

The method of bonding a metallic element to the ion-insulating surface portion of this composite body requires a metallic element which must be moderately deformable. The method comprises juxtaposing the major surfaces of the metal element and the composite body in close surface contact relationship, applying an electric potential across the juxtaposed elements to pass a finite current of low amperage through the juxtaposed elements to effect bonding between the juxtaposed surfaces. The application of the electric potential is described above in the first method in this application. The method includes bonding at least a portion of at least one major surface of the composite body to a deformable metallic element.

In our method of bonding a composite body to a metallic element, a variety of materials can be employed for the metallic elements. Such materials include various types of steels, aluminum, aluminum alloys, copper, copper alloys, silver, silver alloys, noble metals, molybdenum and silicon. The only requirement is that the metal must be moderately deformable. The metallic element is in the form of a casing with at least one open end, and a sharp edge at the open end. The edge can be a knife edge or similar edge which can be pressed into and bonded with the metallic element of the composite body. The sharp edge of the open end of the casing is positioned against a portion of the metallic element of the composite body. The composite body and casing are then heated, for example, in an inert atmosphere furnace at a temperature in the range from 300° to 600° C. The casing is pressed simultaneously to the deformable metallic element of the body in a range from 100 to 4,000 pounds per square inch. My method effects bonding between the composite body and the casing. We have found desirable temperature to be 350° C. and a desirable pressure to be 2,000 pounds per square inch.

A single casing can be bonded by my method or a casing can be bonded to each opposite major surface of the composite body. Both casings can be bonded simultaneously. The composite body can have one or more apertures therethrough.

Examples of forming a composite body and of bonding a composite body to a metallic are set forth:

EXAMPLE I

A solid ion-conductive electrolyte material element of sodium beta-alunina was provided which has a single aperture through its center thus providing a flange or ring configuration. A pair of moderately deformable metallic elements of aluminum were provided in the form of aluminum foils. The foils were positioned against opposite major surfaces and associated portions of the edge surface of the sodium beta-alumina element. Each foil provided an anode, while graphite paint applied to the sodium beta-alumina electrolyte provided a cathode. The assembly of the sodium beta-alumina element and the aluminum foils was heated in a furnace at a temperature of 525° C. A power source in the form of a battery was provided for each cathode and anode pair. The negative lead of the battery was attached to the cathode, while the positive lead was attached to the anode. An electric potential was applied across each foil and the sodium beta-alumina electrolyte at the same time to thereby pass a finite current of low amperage through the adjacent metallic and sodium beta-alumina electrolyte elements. Effective bonding between the foils and the sodium beta-alumina electrolyte element was accomplished by applying a current density of one milliampere per square centimeter for a period of one hour. Our method converted a surface portion of the sodium beta-alumina electrolyte to an ion-insulating material which is positioned adjacent each foil of the aluminum casing.

EXAMPLE II

The method of Example I is followed except that each of the two aluminum foils was separately bonded to the opposite major surfaces and associated portions of the edge surface of the sodium beta-alumina element, and the temperature employed was 100° C.

EXAMPLE III

The method of Example I is followed except that only one aluminum foil was bonded to a single major surface and an associated portion of the edge surface of the sodium beta-alumina element, and the temperature employed was 25° C.

EXAMPLE IV

A composite body with a single aperture through its center with opposite major surfaces and an edge surface is provided which comprises a solid ion-conductive electrolyte material, a surface portion of an ion-insulating material, and a deformable aluminum foil bonded to a portion of one major surface. A deformable aluminum casing with an open end having a sharp edge is positioned with its sharp edge against the deformable aluminum foil of the composite body. The composite body and casing are heated in an inert atmosphere at a temperature of 350° C. The casing is pressed against the deformable metallic element at 2,000 pounds per square inch to effect bonding between the composite body and the casing.

EXAMPLE V

The method of Examle IV is followed except that the composite body has an aluminum foil bonded to a portion of each major surface and a casing is bonded to each of the aluminum foils on opposite major surfaces of the composite body.

EXAMPLE VI

The method of Example IV is followed except that the composite body has a deformable aluminum foil bonded to a portion of one major surface and an associated portion of the edge surface.

EXAMPLE VII

The method of Example IV is followed except that the composite body has an aluminum foil bonded to a portion of each major surface and an associated portion of the edge surface, and a casing is bonded to each of the aluminum foils on opposite major surfaces of the composite body.

While other modifications of the invention and variations thereof which may be employed within the scope of the invention have not been described, the invention is intended to include such as may be embraced within the following claims.

What we claim as new and desire to secure by Letters Patent of the United States is:

1. A method of forming a composite body which comprises providing a solid ion-conductive electrolyte material element with opposite major surfaces and an edge surface, positioning a moderately deformable metallic element against at least a portion of one major surface and against an associated portion of the edge surface, the electrolyte material element containing mobile ions of a metal different from the metallic element, applying an electric potential across the elements to pass a finite current of low amperage through the elements the convert a surface portion of the ion-conductive electrolyte material element adjacent the metallic element to an ion-insulating material and to effect bonding between the surfaces of the electrolyte material element and the metallic element.

2. A method of forming a composite body as in claim 1, in which the composite body has at least one aperture therethrough.

3. A method of forming a composite body as in claim 1, in which a moderately deformable metallic element is positioned against at least a portion of each major surface and against at least an associated portion of the edge surface.

4. A method of forming a composite body as in claim 3, in which the composite body has at least one aperture therethrough.